(12) United States Patent
Yamamoto

(10) Patent No.: US 9,859,802 B2
(45) Date of Patent: Jan. 2, 2018

(54) METHOD OF CONTROLLING POWER CONVERSION APPARATUS, AND POWER CONVERSION APPARATUS

(71) Applicant: TOYOTA JIDOSHA KABUSHIKI KAISHA, Toyota-shi, Aichi-ken (JP)

(72) Inventor: Takuya Yamamoto, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 54 days.

(21) Appl. No.: 15/148,281

(22) Filed: May 6, 2016

(65) Prior Publication Data

US 2016/0336866 A1 Nov. 17, 2016

(30) Foreign Application Priority Data

May 12, 2015 (JP) ................................ 2015-097416

(51) Int. Cl.
  *H02M 3/335* (2006.01)
  *H02M 1/32* (2007.01)
  *H02M 3/337* (2006.01)
  *H02M 1/00* (2006.01)

(52) U.S. Cl.
  CPC ......... *H02M 3/33569* (2013.01); *H02M 1/32* (2013.01); *H02M 3/3376* (2013.01); *H02M 3/33584* (2013.01); *H02M 2001/009* (2013.01); *H02M 2001/0093* (2013.01); *H02M 2001/325* (2013.01)

(58) Field of Classification Search
  CPC .......... H02M 3/22; H02M 3/24; H02M 3/325; H02M 3/335; H02M 3/33569; H02M 3/3353

USPC ...................................................... 363/15–17
See application file for complete search history.

(56) References Cited

U.S. PATENT DOCUMENTS 8,829,713 B2 * 9/2014 Ishigaki ................. B60R 25/00
  307/66
2011/0198933 A1  8/2011 Ishigaki et al.
2014/0346871 A1  11/2014 Hirano
  (Continued)

FOREIGN PATENT DOCUMENTS

JP  2011-193713 A  9/2011
JP  2014-230371 A  12/2014

*Primary Examiner* — Nguyen Tran
(74) *Attorney, Agent, or Firm* — Andrews Kurth Kenyon LLP

(57) ABSTRACT

A method of controlling switching primary and secondary full-bridge circuits, includes, when a fault is detected in a first voltage detection unit that detects the voltage of a first port, deriving a command duty cycle to adjust the voltage of a second port to a target voltage, by receiving feedback of a detected voltage of the second port by a second voltage detection unit; deriving an estimated phase difference corresponding to target power of transmission power transmitted from the secondary full-bridge circuit to the primary full-bridge circuit, and the command duty cycle, from a correspondence relation among a phase difference between switching of the primary and secondary full-bridge circuits, a duty cycle of the switching of the primary full-bridge circuit, and the transmission power; and controlling the phase difference to the estimated phase difference, and controlling the duty cycle to the command duty cycle.

10 Claims, 7 Drawing Sheets

(56) References Cited

U.S. PATENT DOCUMENTS

| | | | |
|---|---|---|---|
| 2015/0244279 A1* | 8/2015 | Takagi | H02M 3/33584 363/17 |
| 2015/0263632 A1* | 9/2015 | Hirano | H02M 3/33546 363/17 |

* cited by examiner

METHOD OF CONTROLLING POWER CONVERSION APPARATUS, AND POWER CONVERSION APPARATUS

FIELD

The following disclosure generally relates to a method of controlling a power conversion apparatus, and a power conversion apparatus.

BACKGROUND

A power conversion apparatus has been known that includes a primary full-bridge circuit having a primary coil of a transformer disposed at a bridge part; a secondary full-bridge circuit having a secondary coil of the transformer disposed at a bridge part; a first port connected with a positive bus-bar of the primary full-bridge circuit; and a second port connected with a tap of the primary coil (see, for example, Patent Documents 1 and 2).

Patent Document 1 describes a control unit that controls the phase difference between switching of the primary full-bridge circuit, and switching of the secondary full-bridge circuit, and controls the duty cycle of switching of the primary full-bridge circuit.

Further, Patent Document 2 describes a control unit that generates a command value of the phase difference to converge the actual voltage of the first port to a target voltage of the first port, by receiving feedback of a detection result of the voltage of the first port, and generates a command value of the duty cycle to converge the actual voltage of the second port to a target voltage of the second port, by receiving feedback of a detection result of the voltage of the second port. This control unit executes switching control of the primary full-bridge circuit and the secondary full-bridge circuit, following the command value of the phase difference and the command values of the duty cycle that have been generated.

RELATED-ART DOCUMENTS

Patent Documents

[Patent Document 1] Japanese Laid-open Patent Publication No. 2011-193713
[Patent Document 2] Japanese Laid-open Patent Publication No. 2014-230371

However, if a fault occurs in a voltage detection unit for detecting the voltage of a port, a detection result of the voltage of the port cannot be fed back accurately, and hence, it may not be possible to continue to switching control of the primary full-bridge circuit and the secondary full-bridge circuit.

Thereupon, an object is to provide a method of controlling a power conversion apparatus, and a power conversion apparatus that can continue switching control of the primary full-bridge circuit and the secondary full-bridge circuit even if a fault occurs in the voltage detection unit for detecting the voltage of the port.

SUMMARY

According to an embodiment, a method of controlling a power conversion apparatus is provided. The power conversion apparatus includes a transformer configured to include a primary coil and a secondary coil, a primary full-bridge circuit configured to have the primary coil disposed at a bridge part, a secondary full-bridge circuit configured to have the secondary coil disposed at a bridge part, a first port configured to be connected with a positive bus-bar of the primary full-bridge circuit, a second port configured to be connected with a tap of the primary coil, a first voltage detection unit configured to detect a voltage of the first port, and a second voltage detection unit configured to detect a voltage of the second port. The method includes detecting a fault in the first voltage detection unit and the second voltage detection unit; and executing, when the fault of the second voltage detection unit is not detected, and the fault of the first voltage detection unit is detected by the detecting, deriving a first command duty cycle to adjust the voltage of the second port to a target voltage of the second port, by receiving feedback of a detection result of the voltage of the second port by the second voltage detection unit, deriving a first estimated phase difference corresponding to target power, which is a target value of transmission power transmitted from the secondary full-bridge circuit to the primary full-bridge circuit, and the first command duty cycle, from a correspondence relation among a phase difference between switching of the primary full-bridge circuit and switching of the secondary full-bridge circuit, a duty cycle of the switching of the primary full-bridge circuit, and the transmission power, and controlling the phase difference to the first estimated phase difference, and controlling the duty cycle to the first command duty cycle.

Also, according to another embodiment, a method of controlling a power conversion apparatus is provided. The power conversion apparatus includes a transformer configured to include a primary coil and a secondary coil, a primary full-bridge circuit configured to have the primary coil disposed at a bridge part, a secondary full-bridge circuit configured to have the secondary coil disposed at a bridge part, a first port configured to be connected with a positive bus-bar of the primary full-bridge circuit, a second port configured to be connected with a tap of the primary coil, a first voltage detection unit configured to detect a voltage of the first port, and a second voltage detection unit configured to detect a voltage of the second port. The method includes detecting a fault in the first voltage detection unit and the second voltage detection unit; and executing, when the fault of the first voltage detection unit is not detected, and the fault of the second voltage detection unit is detected by the detecting, deriving a first command phase difference to adjust the voltage of, the first port to a target voltage of the first port by receiving feedback of a detection result of the voltage of the first port by the first voltage detection unit, deriving a first estimated duty cycle corresponding to target power, which is a target value of transmission power transmitted from the secondary full-bridge circuit to the primary full-bridge circuit, and the first command phase difference, from a correspondence relation among a phase difference between switching of the primary full-bridge circuit and switching of the secondary full-bridge circuit, a duty cycle of the switching of the primary full-bridge circuit, and the transmission power, and controlling the phase difference to the first command phase difference, and controlling the duty cycle to the first estimated duty cycle.

According to an embodiment, even if a fault occurs in the first voltage detection unit, the phase difference is controlled to the first estimated phase difference, the duty cycle is controlled to the first command duty cycle, and hence, the switching control of the primary full-bridge circuit and the secondary full-bridge circuit can be continued. Also, according to another embodiment, even if a fault occurs in the second voltage detection unit, the phase difference is controlled to the first command phase difference, the duty cycle is controlled to the first estimated duty cycle, and hence, the switching control of the primary full-bridge circuit and the secondary full-bridge circuit can be continued.

DESCRIPTION OF EMBODIMENTS

In the following, embodiments will be described with reference to the drawings.

Figure 1:
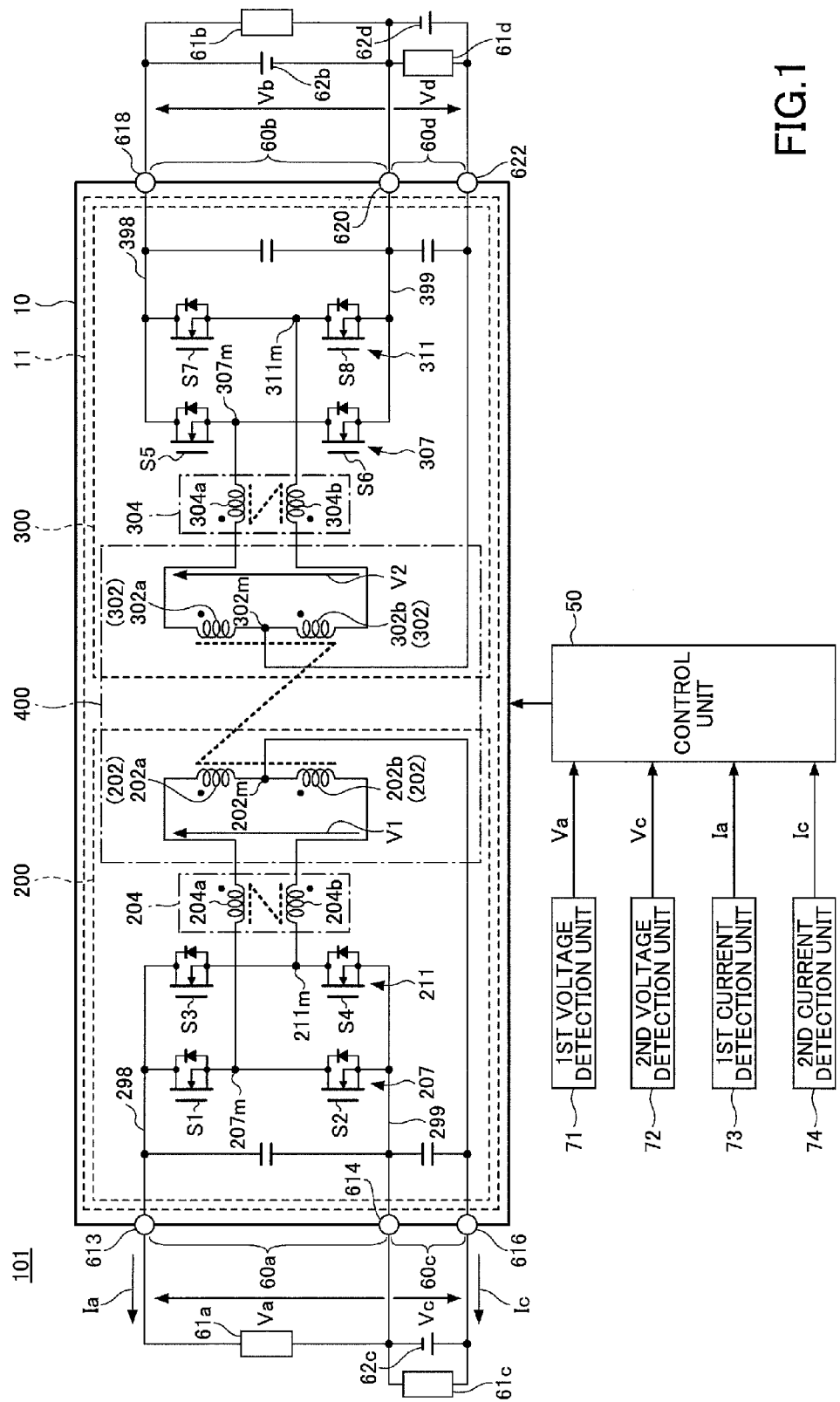
FIG. 1 is a configuration diagram that illustrates an example of a power conversion apparatus.

FIG. 1 is a diagram that illustrates an example of a configuration of a power supply apparatus 101 as an embodiment of a power conversion apparatus. The power supply apparatus 101 is installed, for example, in a vehicle such as an automobile, and is an example of a power supply system for the vehicle to distribute power to loads installed in the vehicle. The power supply apparatus 101 includes, for example, a power supply circuit 10, and a control circuit 50.

The power supply circuit 10 is an example of a power conversion circuit that includes at least two or more multiple ports, and has functions to convert power between two ports selected arbitrarily among the multiple ports. The power supply circuit 10 in the embodiment includes four ports (a first port 60a, a second port 60c, a third port 60b, and a fourth port 60d), and a converter 11.

The first port 60a is an example of a first terminal part of the power supply circuit 10 and is connected with, for example, a load 61a. The first port 60a is an input/output port that is connected with a primary full-bridge circuit 200, and disposed between a positive bus-bar on the primary side 298 and a negative bus-bar on the primary side 299. The first port 60a is configured to include a terminal 613 and a terminal 614.

The second port 60c is an example of a second terminal part of the power supply circuit 10, and is connected with, for example, a battery 62c and a load 61c. The second port 60c is an input/output port that is connected with a tap 202m on the primary side of a transformer 400, and disposed between the negative bus-bar on the primary side 299 and the tap 202m of the primary coil 202. The second port 60c is configured to include a terminal 614 and a terminal 616.

The third port 60b is an example of a third terminal part of the power supply circuit 10, and is connected with, for example, a battery 62b and a load 61b. The third port 60b is an input/output port that is connected with a secondary full-bridge circuit 300, and disposed between a positive bus-bar on the secondary side 398 and a negative bus-bar on the secondary side 399. The third port 60b is configured to include a terminal 618 and a terminal 620.

The fourth port 60d is an example of a fourth terminal part of the power supply circuit 10, and is connected with, for example, a battery 62d and a load 61d. The fourth port 60d is an input/output port that is connected with a tap 302m on the secondary side of the transformer 400, and disposed between the negative bus-bar on the secondary side 399 and the tap 302m of the secondary coil 302. The fourth port 60d is configured to include a terminal 620 and a terminal 622.

Port voltages Va, Vb, Vc, and Vd are input voltages or output voltages at the first port 60a, the second port 60c, the third port 60b, and the fourth port 60d, respectively.

The converter 11 is an example of a DC-DC converter that converts the voltage of DC power input at one port, and outputs the voltage-converted DC power to the other port. The converter 11 in the embodiment includes, for example, the transformer 400, the primary full-bridge circuit 200, and the secondary full-bridge circuit 300. The primary full-bridge circuit 200 and the secondary full-bridge circuit 300 are magnetically coupled in the transformer 400. Ports on the primary side including the first port 60a and the second port 60c, and ports on the secondary side including the third port 60b and the fourth port 60d, are connected via the transformer 400.

The transformer 400 includes a primary coil 202 and a secondary coil 302, and has magnetic coupling between the primary coil 202 and the secondary coil 302 with a coupling coefficient kT, to serve as a transformer having the ratio of the numbers of turns 1:N between the primary coil 202 and the secondary coil 302. Here, N is a positive number greater than 1.

The primary coil 202 includes a first winding on the primary side 202a, a second winding on the primary side 202b, and the tap 202m that is drawn out from an intermediate connection point between the first winding on the primary side 202a, and the second winding on the primary side 202b. The tap 202m is connected with the terminal 616 on the higher potential side of the second port 60c. The tap 202m is, for example, a center tap drawn out from the intermediate connection point between the first winding on the primary side 202a and the second winding on the primary side 202b, with each winding having the same number of turns.

The secondary coil 302 includes a first winding on the secondary side 302a, a second winding on the secondary side 302b, and the tap 302m that is drawn out from an intermediate connection point between the first winding on the secondary side 302a and the second winding on the secondary side 302b. The tap 302m is connected with the terminal 622 on the higher potential side of the fourth port 60d. The tap 302m is, for example, a center tap drawn out from the intermediate connection point between the first winding on the secondary side 302a and the second winding on the secondary side 302b, with each winding having the same number of turns.

The primary full-bridge circuit 200 is disposed on the primary side of the transformer 400. The primary full-bridge circuit 200 includes the positive bus-bar on the primary side 298, which is connected with the terminal 613 on the higher potential side of the first port 60a, and the negative bus-bar on the primary side 299, which is connected with the terminal 614 on the lower potential side of the first port 60a and the second port 60c.

A first arm circuit 207 is connected between the positive bus-bar on the primary side 298, and the negative bus-bar on the primary side 299. The first arm circuit 207 is configured to have an arm S1 placed on the high side of a midpoint 207m, an arm S2 disposed on the low side of the midpoint 207m, and the arms S1 and S2 connected in series. The midpoint 207m is a first connection point on the primary side, with which the arm S1 and the arm S2 are connected.

A second arm circuit 211 is connected between the positive bus-bar on the primary side 298, and the negative bus-bar on the primary side 299. The second arm circuit 211 is configured to have an arm S3 placed on the high side of a midpoint 211m, an arm S4 disposed on the low side of the midpoint 211m, and the arms S3 and S4 connected in series. The second arm circuit 211 is connected in parallel with the first arm circuit 207. The midpoint 211m is a second connection point on the primary side, between the arm S3 and the arm S4.

The primary full-bridge circuit 200 includes a bridge part that connects the midpoint 207m of the first arm circuit 207 with the midpoint 211m of the second arm circuit 211. The bridge part has the primary coil 202 and a magnetic coupling reactor on the primary side 204 disposed. The primary coil 202 is inserted in series between the midpoint 207m and the midpoint 211m. The magnetic coupling reactor on the primary side 204 includes a first reactor on the primary side 204a that is inserted in series between the midpoint 207m and the primary coil 202, and a second reactor on the primary side 204b that is inserted in series between the midpoint 211m and the primary coil 202. The first reactor on the primary side 204a has magnetic coupling with the second reactor on the primary side 204b with a coupling coefficient k1.

The secondary full-bridge circuit 300 is disposed on the secondary side of the transformer 400. The secondary full-bridge circuit 300 includes the positive bus-bar on the secondary side 398 that is connected with the terminal 618 on the higher potential side of the third port 60b, and the negative bus-bar on the secondary side 399 that is connected with the terminal 620 on the lower potential side of the third port 60b and the fourth port 60d.

A third arm circuit 307 is connected between the positive bus-bar on the secondary side 398, and the negative bus-bar on the secondary side 399. The third arm circuit 307 is configured to have an arm S5 placed on the high side of a midpoint 307m, an arm S6 disposed on the low side of the midpoint 307m, and the arms S5 and S6 connected in series. The midpoint 307m is a first connection point on the secondary side, with which the arm 51 and the arm S6 are connected.

A fourth arm circuit 211 is connected between the positive bus-bar on the secondary side 398, and the negative bus-bar on the secondary side 399. The fourth arm circuit 211 is configured to have an arm S7 placed on the high side of a midpoint 311m, and an arm S8 disposed on the low side of the midpoint 311m, and the arms S7 and S8 connected in series. The fourth arm circuit 311 is connected in parallel with the third arm circuit 307. The midpoint 311m is a second connection point on the primary side, between the arm S7 and the arm S8.

The secondary full-bridge circuit 300 includes a bridge part that connects the midpoint 307m of the third arm circuit 307 with the midpoint 311m of the fourth arm circuit 311. The bridge part has the secondary coil 302 and a magnetic coupling reactor on the secondary side 304 disposed. The secondary coil 302 is inserted in series between the midpoint 307m and the midpoint 311m. The magnetic coupling reactor on the secondary side 304 includes a first reactor on the secondary side 304a that is inserted in series between the midpoint 307m and the secondary coil 302, and a second reactor on the secondary side 304b that is inserted in series between the midpoint 311m and the secondary coil 302. The second reactor on the secondary side 304a has magnetic coupling with the second reactor on the secondary side 304b with a coupling coefficient k1.

The arms S1-S8 are switching elements that are configured to include, for example, N-channel MOSFETs and body diodes (parasitic diodes), which are parasitic elements of the MOSFETs, respectively. Diodes may be additionally connected in parallel with the arms.

Note that the fourth port 60d may be omitted. If the fourth port 60d is omitted, the tap 302m and the magnetic coupling reactor on the secondary side 304 may also be omitted.

The control unit 50 is an example of a control unit that controls a voltage conversion operation of the converter 11, generates a control signal to have the converter 11 execute a voltage conversion operation, and outputs the control signal to the converter 11. The control unit 50 in the embodiment outputs control signals to turn on and off the arms in the primary full-bridge circuit 200 and the secondary full-bridge circuit 300. As specific examples of the control unit 50, one may consider a microcomputer that includes a CPU (Central Processing Unit), a control circuit that includes a microcomputer, and a control device that includes a microcomputer and a control circuit connected with the microcomputer (for example, an ECU (Electronic Control Unit)).

Figure 2:
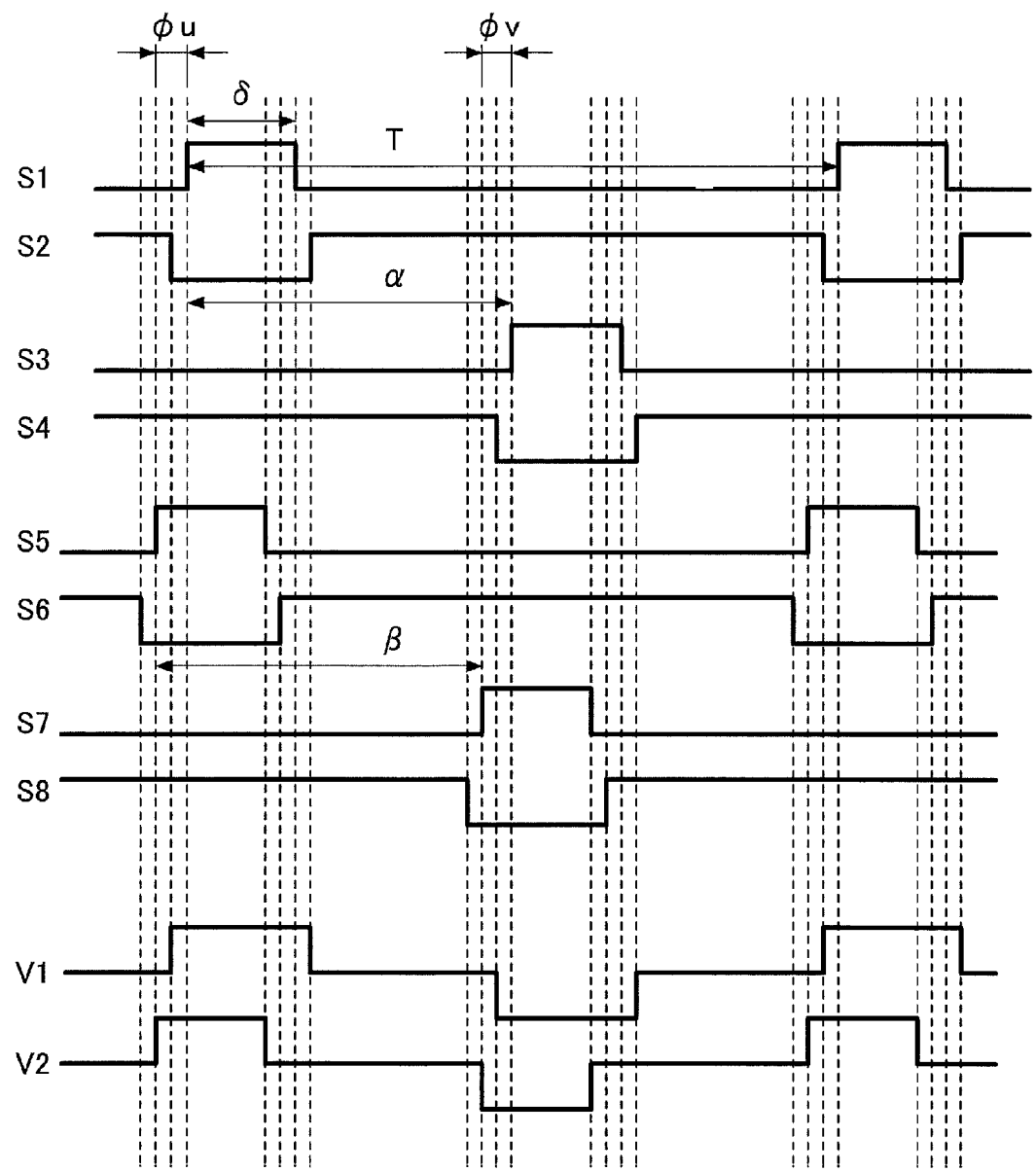
FIG. 2 is a timing chart that illustrates an example of switching operations of arms.

FIG. 2 is an example of a timing chart that illustrates an example of switching operations of the arms S1-S8. In on/off waveforms of the arms S1-S8, the high level represents on states, and the low-level represents off states. V1 represents a voltage generated between both terminals of the primary coil 202 of the transformer 400, and V2 represents a voltage generated between both terminals of the secondary coil 302 of the transformer 400.

A duty cycle D (=δ/T) represents a ratio of an on time δ occupying a switching cycle T of the arm S1 and the arm S3 in the primary full-bridge circuit 200, and also represents a ratio of an on time δ occupying the switching cycle T of the arm S5 and the arm S7 in the secondary full-bridge circuit 300. The switching cycle T of the arms included in the primary full-bridge circuit 200, is equivalent to the switching cycle T of the arms included in the secondary full-bridge circuit 300.

Both the primary full-bridge circuit 200 and the secondary full-bridge circuit 300 are circuits, as illustrated in FIG. 1, that include a booster/stepping-down circuit with which a voltage can be boosted or stepped down. Therefore, by controlling the duty cycle D, the control unit 50 can adjust the boosting/stepping-down ratio of both full-bridge circuits of the primary full-bridge circuit 200 and the secondary full-bridge circuit 300, to a desired value.

The control unit 50 in the embodiment controls the duty cycle D of switching of the secondary full-bridge circuit 300 to the same value as the duty cycle D of switching of the primary full-bridge circuit 200. By controlling the duty cycle D of switching of the secondary full-bridge circuit 300 to the same value as the duty cycle D of switching of the primary full-bridge circuit 200, the boosting/stepping-down ratio of the primary full-bridge circuit 200 becomes equivalent to the boosting/stepping-down ratio of the secondary full-bridge circuit 300.

Since both the primary full-bridge circuit 200 and the secondary full-bridge circuit 300 include the booster/stepping-down circuit with which a voltage can be boosted or stepped down, the following relationships are satisfied:

port voltage $Vc$=port voltage $Va$×duty cycle $D$ port voltage $Vd$=port voltage $Vb$×duty cycle $D$ On the other hand, the primary coil 202 disposed at the bridge part of the primary full-bridge circuit 200, and the secondary coil 302 disposed at the bridge part of the secondary full-bridge circuit 300 have magnetic coupling.

Therefore, by controlling a phase difference $\varphi$ between switching of the primary full-bridge circuit 200 and switching of the secondary full-bridge circuit 300, the control unit 50 can adjust transmission power P transmitted between the secondary full-bridge circuit 300 and the primary full-bridge circuit 200 via the transformer 400, to a desired value.

A phase difference $\varphi$ is a shift of switching timings between corresponding arm circuits in the primary full-bridge circuit 200 and the secondary full-bridge circuit 300. The phase differences $\varphi$ include a first phase difference $\varphi u$ and a second phase difference $\varphi v$.

The first phase difference $\varphi u$ is a time difference between switching timing of the first arm circuit 207 and switching timing of the third arm circuit 307, and the second phase difference $\varphi v$ is a time difference between switching timing of the second arm circuit 211 and switching timing of the fourth arm circuit 311.

As illustrated in FIG. 2, for example, the first phase difference $\varphi u$ is a phase difference between the on timing of the arm S1 and the on timing of the arm S5, and the second phase difference $\varphi v$ is a phase difference between the on timing of the arm S3 and the on timing of the arm S7.

Note that the first phase difference $\varphi u$ and the second phase difference $\varphi v$ may be phase differences of a voltage V1 between both terminals of the primary coil 202, and a voltage V2 between both terminals of the secondary coil 302. In this case, for example, the first phase difference $\varphi u$ may be a phase difference between the on timing of the arm S5 and the off timing of the arm S2, and the second phase difference $\varphi v$ may be a phase difference between the on timing of the arm S7 and the off timing of the arm S4.

Here, the on timing is timing when an arm switches from off to on, and the off timing is timing when an arm switches from on to off.

Also, in a steady state, the control unit 50 has the arm S1 and the arm S3 operate with a phase difference $\alpha$ of, for example, 180° ($\pi$), and has the arm S5 and the arm S7 operate with a phase difference $\beta$ of 180° ($\pi$).

The control circuit 50 in the embodiment can transmit the transmission power P from the secondary full-bridge circuit 300 to the primary full-bridge circuit 200, by controlling the first phase difference $\varphi u$ to a positive value and the second phase difference $\varphi v$ to a positive value. In other words, between the corresponding arm circuits of the primary full-bridge circuit 200 and the secondary full-bridge circuit 300, the transmission power P is transmitted from one of the full-bridge circuits that has the arm circuit whose high-side arm turns on first, to the other full-bridge circuit that has the arm circuit whose high-side arm turns on later.

FIG. 2 illustrates an example of a case where the control unit 50 controls the first phase difference $\varphi u$ to a positive value and the second phase difference $\varphi v$ to a positive value. In this case, the transmission power P is transmitted from the secondary full-bridge circuit 300 to the primary full-bridge circuit 200.

The control circuit 50 in the embodiment controls the first phase difference $\varphi u$ and the second phase difference $\varphi v$ to take the same value.

In FIG. 1, the power supply apparatus 101 includes a first voltage detection unit 71 that detects the port voltage Va of the first port 60a and outputs the detected value of the port voltage Va, and a second voltage detection unit 72 that detects the port voltage Vc of the second port 60c and outputs the detected value of the port voltage Vc. As specific examples of the first voltage detection unit 71 and the second voltage detection unit 72, one may consider a voltage sensor that divides a voltage by a resistor or the like to detect a port voltage, and an AD converter that converts an analog value of a port voltage into a digital value.

In FIG. 1, the power supply apparatus 101 includes a first current detection unit 73 that detects a port current Ia flowing in the first port 60a and outputs the detected value of the port current Ia, and a second current detection unit 74 that detects a port current Ic flowing in the second port 60c and outputs the detected value of the port current Ic. The port current Ia is an input/output current at the first port 60a, and the port current Ic is an input/output current at the second port 60c.

As specific examples of the first current detection unit 73, one may consider a current sensor that monitors the current flowing in the terminal 613 to measure the port current Ia, and a receiver circuit that receives the data of the measured port current Ia measured in the load 61a, from the load 61a. As specific examples of the second current detection unit 74, one may consider a current sensor that monitors the current flowing in the terminal 616 to measure the port current Ic, and a receiver circuit that receives the data of the measured port current Ic measured in the load 61c, from the load 61c.

Figure 3:
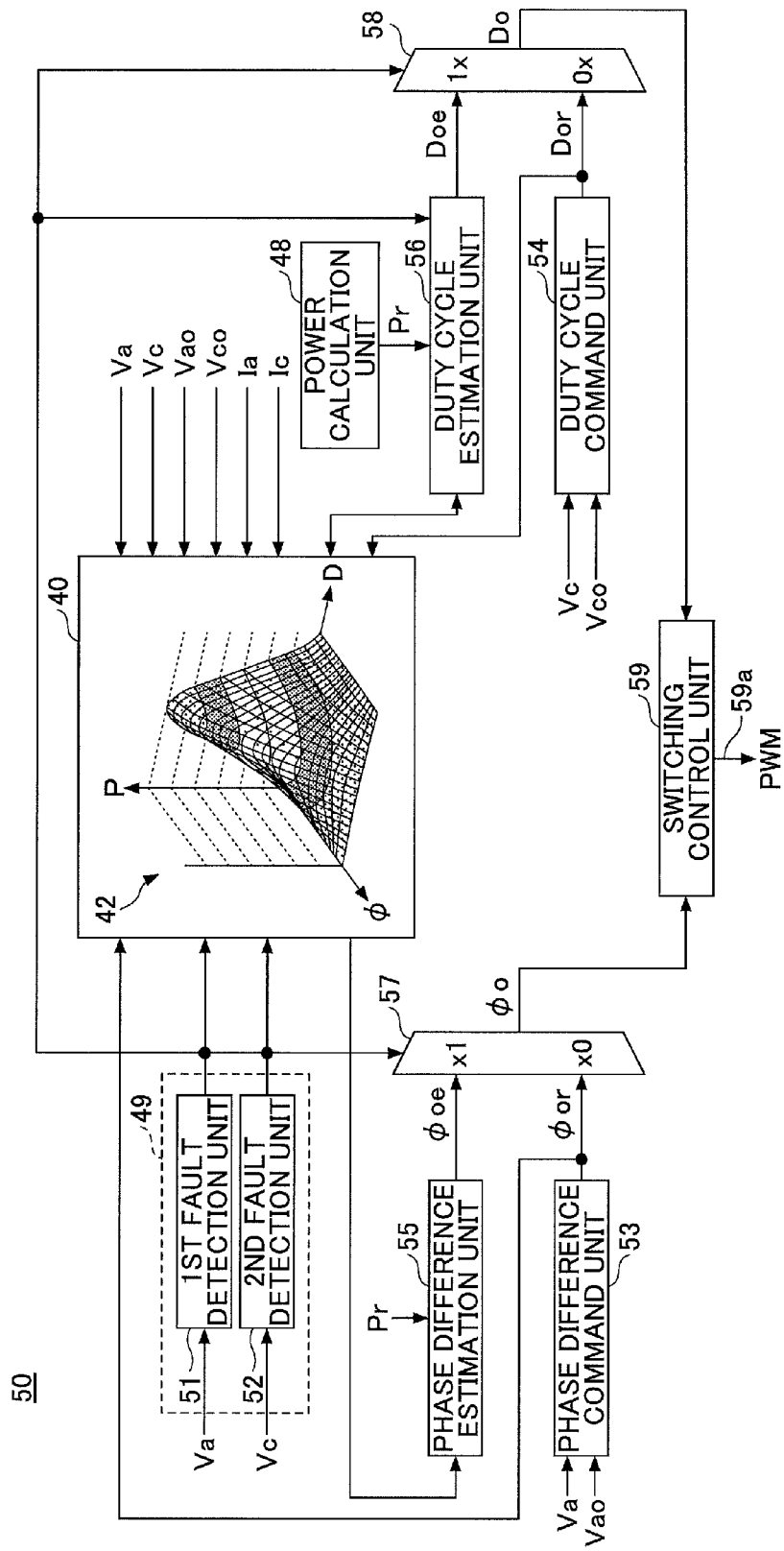
FIG. 3 is a block diagram that illustrates an example configuration of a control unit.

FIG. 3 is a block diagram that illustrates an example configuration of the control unit 50. The control unit 50 includes a fault determination unit 49, a phase difference command unit 53, a duty cycle command unit 54, a phase difference estimation unit 55, a duty cycle estimation unit 56, a first selection unit 57, a second selection unit 58, and a switching control unit 59.

The fault determination unit 49 is an example of a unit that determines whether any faults have occurred in the first voltage detection unit 71 detecting the port voltage Va, and whether any faults have occurred in the second voltage detection unit 72 detecting the port voltage Vc. Faults in a voltage detection unit may include not only a fault and the like in the voltage detection unit itself, but also a defect of wiring connected with the voltage detection unit. The fault determination unit 49 includes a first fault detection unit 51 that detects a fault in the first voltage detection unit 71, and a second fault detection unit 52 that detects a fault in the second voltage detection unit 72.

Figure 4:
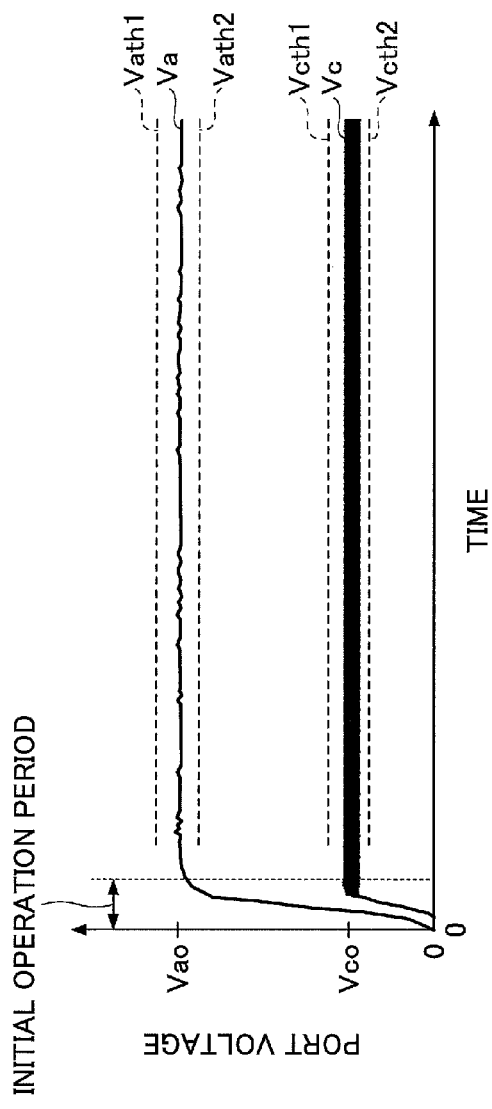
FIG. 4 is a diagram that illustrates an example of a relationship between port voltages and time.

FIG. 4 is a diagram that illustrates an example of the relationship between the port voltages and time. To avoid an erroneous detection of a fault in the first voltage detection unit 71, the first fault detection unit 51 detects whether the first voltage detection unit 71 is faulty, for example, after an initial operation period has passed that is a predetermined period during which the port voltage Va rises from zero to a target voltage Vao. After the initial operation period has passed, if the detected value of the port voltage Va detected by the first voltage detection unit 71, deviates from a predetermined first voltage range for a predetermined first elapsed time or longer, the first fault detection unit 51 detects it as the first voltage detection unit 71 being faulty. An upper limit threshold Vath1 of the first voltage range is a voltage that is set higher than the target voltage Vao, and a lower limit threshold Vath2 of the first voltage range is a voltage that is set lower than the target voltage Vao.

Similarly, to avoid an erroneous detection of a fault in the second voltage detection unit 72, the second fault detection unit 52 detects whether the second voltage detection unit 72 is faulty, for example, after an initial operation period has passed that is a predetermined period during which the port voltage Vc rises from zero to a target voltage Vco. After the initial operation period has passed, if the detected value of the port voltage Vc detected by the second voltage detection unit 72, deviates from a predetermined second voltage range for a predetermined second elapsed time or longer, the second fault detection unit 52 detects it as the second voltage detection unit 72 being faulty. An upper limit threshold Vcth1 of the second voltage range is a voltage that is set higher than the target voltage Vco, and a lower limit threshold Vcth2 of the second voltage range is a voltage that is set lower than the target voltage Vco.

Note that the first fault detection unit 51 may continue to detect that the first voltage detection unit 71 is faulty while a fault in the first voltage detection unit 71 is not detected anymore after the fault in the first voltage detection unit 71 has been detected. This makes it possible to prevent control precision of the phase difference φ or the duty cycle D from decreasing due to repeated detection of a fault. It is the same for the second fault detection unit 52.

Also, the first fault detection unit 51 may detect a fault in the first voltage detection unit 71, based on information that is different from a detected value of the port voltage (for example, fault information by diagnosis). It is the same for the second fault detection unit 52.

In FIG. 3, by receiving feedback of a detection result of the port voltage Va by the first voltage detection unit 71, the phase difference command unit 53 derives a command phase difference φor to adjust the port voltage Va to the target voltage Vao set for the first port 60a. The target voltage Vao is, for example, 48 V.

Figure 5:
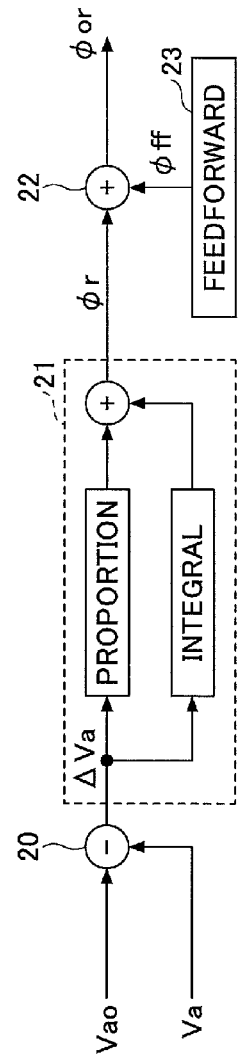
FIG. 5 is a block diagram that illustrates an example configuration of a phase difference command unit.

FIG. 5 is a block diagram that illustrates an example configuration of the phase difference command unit 53. The phase difference command unit 53 outputs a phase difference derived by receiving feedback of a detection result of the port voltage Va, to make the port voltage Va become equivalent to the target voltage Vao, as a command phase difference φor. The phase difference command unit 53 includes, for example, a subtracter 20, a PI calculation unit 21, an adder 22, and a feedforward unit 23.

The subtracter 20 calculates the deviation ΔVa between the target voltage Vao of the first port 60a, and the port voltage Va from the first voltage detection unit 71 as feedback input.

The PI calculation unit 21 executes PI control that combines a proportional operation (P operation) and an integral operation (I operation) with respect to the deviation ΔVa, to derive an adjustment reference value φr by which the phase difference φ is to be adjusted. The PI calculation unit 21 may execute PID control that combines a proportional operation, an integral operation, and a differential operation (D operation) with respect to the deviation ΔVa, to derive an adjustment reference value φr.

The feedforward unit 23 executes feedforward control to set in advance a control center value φff of the phase difference φ required for transmitting command transmission power Po so as to make the port voltage Va converge on the target voltage Vao easily. The command transmission power Po is transmission power P required by the one of the primary full-bridge circuit 200 and the secondary full-bridge circuit 300, to be supplied from the other full-bridge circuit.

The adder 22 outputs a phase difference newly derived by adding the adjustment reference value φr and the control center value φff, as the command phase difference φor.

In FIG. 3, by receiving feedback of a detection result of the port voltage Vc by the second voltage detection unit 72, the duty cycle command unit 54 derives a command duty cycle Dor to adjust the port voltage Vc to the target voltage Vco set for the second port 60c. The target voltage Vco is, for example, 12V.

Figure 6:
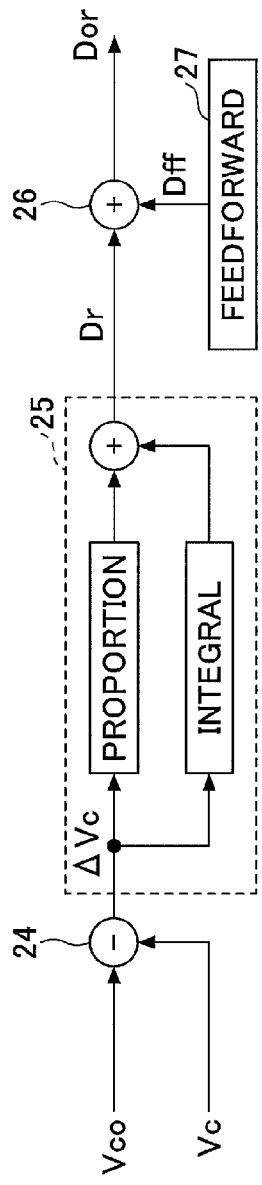
FIG. 6 is a block diagram that illustrates an example configuration of a duty cycle command unit.

FIG. 6 is a block diagram that illustrates an example configuration of the duty cycle command unit 54. The duty cycle command unit 54 outputs a duty cycle derived by receiving feedback of a detection result of the port voltage Vc to make the port voltage Vc become equivalent to the target voltage Vco, as a command duty cycle Dor. The duty cycle command unit 54 includes, for example, a subtracter 24, a PI calculation unit 25, an adder 26, and a feedforward unit 27.

The subtracter 24 calculates the deviation ΔVc between the target voltage Vco of the second port 60c, and the port voltage Vc from the second voltage detection unit 72 as feedback input.

The PI calculation unit 25 executes PI control that combines a proportional operation (P operation) and an integral operation (I operation) with respect to the deviation ΔVc, to derive an adjustment reference value Dr by which the duty cycle D is to be adjusted. The PI calculation unit 21 may execute PID control that combines a proportional operation, an integral operation, and a differential operation (D operation) with respect to the deviation ΔVc, to derive an adjustment reference value Dr.

The feedforward unit 27 executes feedforward control to set in advance a control center value Dff of the duty cycle D required for boosting or stepping down the port voltage Vc to the target voltage Vco so as to make the port voltage Vc converge on the target voltage Vco easily.

The adder 26 outputs a duty cycle newly derived by adding the adjustment reference value Dr and the control center value Dff, as the command duty cycle Dor.

In FIG. 3, if a fault is not detected in both the first fault detection unit 51 and the second fault detection unit 52, the switching control unit 59 outputs a control signal 59a that controls the phase difference φ to the command phase difference φor, and controls the duty cycle D to the command duty cycle Dor. The control signal 59a is, for example, a signal of a pulse width modulation (PWM) method.

The switching control unit 59 may be a drive circuit that drives the arms S1-S8 (see FIG. 1), or may be a drive control circuit that controls driving the drive circuit. In other words, the control signal 59a may be a drive signal that is output from the drive circuit to the arms S1-S8, or may be a drive control signal to generate the drive signal.

By outputting the control signal 59a to the converter 11 (see FIG. 1), the switching control unit 59 makes the arms S1-S8 execute switching (namely, control switching the primary full-bridge circuit 200 and the secondary full-bridge circuit 300).

However, as described above, deriving the command phase difference φor requires the port voltage Va detected by the first voltage detection unit 71. Therefore, if a fault occurs in the first voltage detection unit 71, the detection result of the port voltage Va is not fed back precisely, and hence, the command phase difference φor cannot be derived precisely. Consequently, it may not be possible to continue to control switching the primary full-bridge circuit 200 and the secondary full-bridge circuit 300. Similarly, as described above, deriving the command duty cycle Dor requires the port voltage Vc detected by the second voltage detection unit 72. Therefore, if a fault occurs in the second voltage detection unit 72, the detection result of the port voltage Vc is not fed back precisely, and hence, the command duty cycle Dor cannot be derived precisely. Consequently, it may not be possible to continue to control switching the primary full-bridge circuit 200 and the secondary full-bridge circuit 300.

Figure 7:
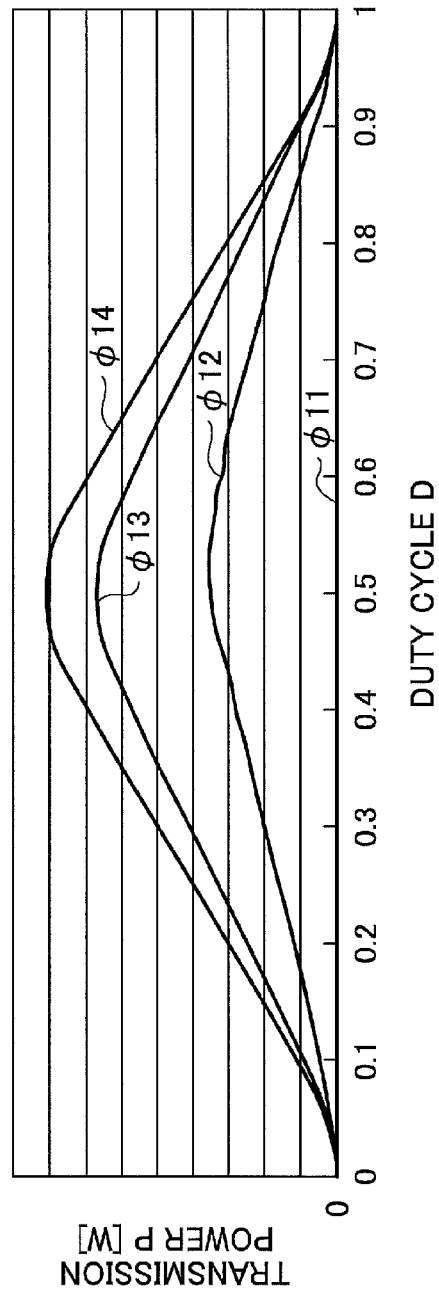
FIG. 7 is a characteristic diagram that illustrates an example of a correspondence relation among transmission power, phase difference, and duty cycle.

On the other hand, FIG. 7 is a characteristic diagram that illustrates an example of a correspondence relation among the phase difference φ, the duty cycle D of the switching of the primary full-bridge circuit 200, and the transmission power P transmitted from the secondary full-bridge circuit 300 to the primary full-bridge circuit 200. Although the transmission power P can be adjusted mainly by controlling the phase difference φ, it is also influenced by the duty cycle D as illustrated in FIG. 7. The transmission power P increases as the phase difference φ increases (φ11<φ12<φ13<φ14). However, even if the phase difference φ is fixed to the same value, the transmission power P decreases as the duty cycle D increases if the duty cycle D is greater than 0.5, and decreases as the duty cycle D decreases if the duty cycle D is less than 0.5.

Thereupon, the control unit 50 includes the phase difference estimation unit 55 (see FIG. 3), to be capable of continuing to control switching the primary full-bridge circuit 200 and the secondary full-bridge circuit 300 even if a fault occurs in the first voltage detection unit 71. From a correspondence relation among the phase difference φ, the duty cycle D, and the transmission power P (referred to as the "correspondence relation X" below), the phase difference estimation unit 55 estimates the phase difference that corresponds to target power Pr set as a target value of the transmission power P and the command duty cycle Dor, and outputs the estimated value as an estimated phase difference φoe. Similarly, the control unit 50 includes the duty cycle estimation unit 56 (see FIG. 3), to be capable of continuing to control switching the primary full-bridge circuit 200 and the secondary full-bridge circuit 300 even if a fault occurs in the second voltage detection unit 72. From the correspondence relation X among the phase difference φ, the duty cycle D, and the transmission power P, the duty cycle estimation unit 56 estimates a duty cycle that corresponds to the target power Pr set as the target value of the transmission power P, and the command phase difference φor, and outputs the estimated value as an estimated duty cycle Doe.

The correspondence relation X defines a predetermined correspondence relation among the phase difference φ, the duty cycle D of the switching of the primary full-bridge circuit 200, and the transmission power P transmitted from the secondary full-bridge circuit 300 to the primary full-bridge circuit 200. The correspondence relation X may be specified by a relationship rule, for example, a map or a calculation formula (a regression equation).

The control unit 50 includes, for example, a power calculation unit 48 to set the target power Pr required for estimating the estimated phase difference φoe or the estimated duty cycle Doe from the correspondence relation X, as the target value of the transmission power P. The power calculation unit 48 calculates the target power Pr, for example, by adding the product of the target voltage Vao multiplied by a detected value of the port current Ia, and the product of the target voltage Vco multiplied by a detected value of the port current Ic (=Vao×Ia+Vco×Ic). The power calculation unit 48 obtains a detected value of the port current Ia detected by the first current detection unit 73, and obtains a detected value of the port current Ic detected by the second current detection unit 74.

By having the target power Pr calculated in this way, it is possible to estimate that the transmission power P currently required is the target power Pr even if a current port voltage Va or Vc cannot be detected due to a fault in the first voltage detection unit 71 or the second voltage detection unit 72. Note that the target power Pr may be a predetermined constant value.

In FIG. 3, the first selection unit 57 selects the command phase difference φor if a fault in the first voltage detection unit 71 is not detected by the first fault detection unit 51, or selects the estimated phase difference φoe if a fault in the first voltage detection unit 71 is detected by the first fault detection unit 51. The first selection unit 57 outputs the selected one of the phase differences as the selected command phase difference φo.

On the other hand, the second selection unit 58 selects the command duty cycle Dor if a fault in the second voltage detection unit 72 is not detected by the second fault detection unit 52, or selects the estimated duty cycle Doe if a fault in the second voltage detection unit 72 is detected by the second fault detection unit 52. The second selection unit 58 outputs the selected one of the duty cycles as the selected command duty cycle Do.

The first selection unit 57 and the second selection unit 58 execute selection operations, for example, following a fault determination value by the fault determination unit 49. The fault determination unit 49 outputs a fault determination value "00" if a fault in the first voltage detection unit 71 is not detected by the first fault detection unit 51, and a fault in the second voltage detection unit 72 is not detected by the second fault detection unit 52. The fault determination unit 49 outputs a fault determination value "01" if a fault in the first voltage detection unit 71 is detected by the first fault detection unit 51, and a fault in the second voltage detection unit 72 is not detected by the second fault detection unit 52. The fault determination unit 49 outputs a fault determination value "10" if a fault in the first voltage detection unit 71 is not detected by the first fault detection unit 51, and a fault in the second voltage detection unit 72 is detected by the second fault detection unit 52. The fault determination unit 49 outputs a fault determination value "11" if a fault in the first voltage detection unit 71 is detected by the first fault detection unit 51, and a fault in the second voltage detection unit 72 is detected by the second fault detection unit 52.

The first selection unit 57 selects and outputs the command phase difference φor if the fault determination value is "x0" (where "x" represents 1 or 0, and the same below), or selects and outputs the estimated phase difference φoe if the fault determination value is "x1". On the other hand, the second selection unit 58 selects and outputs the command duty cycle Dor if the fault determination value is "0x", or selects and outputs the estimated duty cycle Doe if the fault determination value is "1x".

The switching control unit 59 outputs a control signal 59a that controls the phase difference φ to a phase difference selected by the first selection unit 57 (namely, the command phase difference φor or the estimated phase difference φoe), and controls the duty cycle D to a duty cycle selected by the second selection unit 58 (namely, the command duty cycle Dor or the estimated duty cycle Doe).

Therefore, according to the embodiment, even if a fault occurs in the first voltage detection unit 71, the phase difference φ is controlled to the estimated phase difference φoe, and the duty cycle D is controlled to the command duty cycle Dor, and hence, it is possible to continue to control switching the primary full-bridge circuit 200 and the secondary full-bridge circuit 300. On the other hand, even if a fault occurs in the second voltage detection unit 72, the phase difference φ is controlled to the command phase difference φor, and the duty cycle D is controlled to the estimated duty cycle Doe, and hence, it is possible to continue to control switching the primary full-bridge circuit 200 and the secondary full-bridge circuit 300.

Next, a case will be described where both the first voltage detection unit 71 and the second voltage detection unit 72 are faulty. If the second voltage detection unit 72 that detects the port voltage Vc is faulty, the duty cycle command unit 54 cannot derive the command duty cycle Dor precisely, and hence, the phase difference estimation unit 55 cannot use the command duty cycle Dor to derive the estimated phase difference φoe as described above. Similarly, if the first voltage detection unit 71 that detects the port voltage Va is faulty, the phase difference command unit 53 cannot derive the command phase difference φor precisely, and hence, the duty cycle estimation unit 56 cannot use the command phase difference φor to derive the estimated duty cycle Doe.

Thereupon, if a fault in the first voltage detection unit 71 is detected by the first fault detection unit 51, and a fault in the second voltage detection unit 72 is detected by the second fault detection unit 52, the duty cycle estimation unit 56 outputs a calculated duty cycle that is obtained by dividing the target voltage Vco by the target voltage Vao, as the estimated duty cycle Doe. Then, from the correspondence relation X, the phase difference estimation unit 55 estimates a phase difference that corresponds to the target power Pr set as the target value of the transmission power, and the calculated duty cycle obtained by the duty cycle estimation unit 56, and outputs the estimated value as the estimated phase difference φoe.

Since the relation of "port voltage Vc=port voltage Va×duty cycle D" is satisfied, the estimated duty cycle Doe calculated by dividing the target voltage Vco by the target voltage Vao can be temporarily set as the duty cycle D currently required.

Therefore, according to the embodiment, even if faults occur in both the first voltage detection unit 71 and the second voltage detection unit 72, the phase difference φ is controlled to the estimated phase difference φoe, the duty cycle D is controlled to the estimated duty cycle Doe, and hence, it is possible to continue to control switching the primary full-bridge circuit 200 and the secondary full-bridge circuit 300.

Next, the generation of the correspondence relation X will be described.

The control unit 50 includes, for example, a generation unit 40 that generates the correspondence relation X (see FIG. 3). The generation unit 40 repeatedly obtains the command phase difference φor and the command duty cycle Dor during a non-faulty period during which a fault in the first voltage detection unit 71 is not detected by the first fault detection unit 51, and a fault in the second voltage detection unit 72 is not detected by the second fault detection unit 52. Then, the generation unit 40 generates the correspondence relation X, by using the command phase difference φor during a non-faulty period; the command duty cycle Dor during the non-faulty period; and measured data of the transmission power P when controlling the phase difference φ to the command phase difference φor during the non-faulty period, and controlling the duty cycle D to the command duty cycle Dor during the non-faulty period.

In other words, the generation unit 40 generates the correspondence relation X, by using data that is actually obtained during a non-faulty period before a fault in the voltage detection unit is detected. Then, the switching control unit 59 controls the phase difference φ or the duty cycle D following the estimated phase difference φoe or the estimated duty cycle Doe derived based on the correspondence relation X generated in this way. Consequently, it is possible to make transmission power P and a duty cycle D obtained as a control result during a faulty period of the voltage detection unit, be closer as much as possible to transmission power P and a duty cycle D obtained as a control result during a non-faulty period of the voltage detection unit.

The generation unit 40 can calculate the measured data of the transmission power P that is actually transmitted, by adding the product of a detected value of the port voltage Va multiplied by a detected value of the port current Ia, and the product of a detected value of the port voltage Vc multiplied by a detected value of the port current Ic. The generation unit 40 may obtain the measured data of the transmission power P that is actually transmitted, by using the power calculation unit 48.

The generation unit 40 obtains a detected value of the port voltage Va detected by the first voltage detection unit 71, obtains a detected value of the port voltage Vc detected by the second voltage detection unit 72, obtains a detected value of the port current Ia detected by the first current detection unit 73, and obtains a detected value of the port current Ic detected by the second current detection unit 74.

Figure 8:
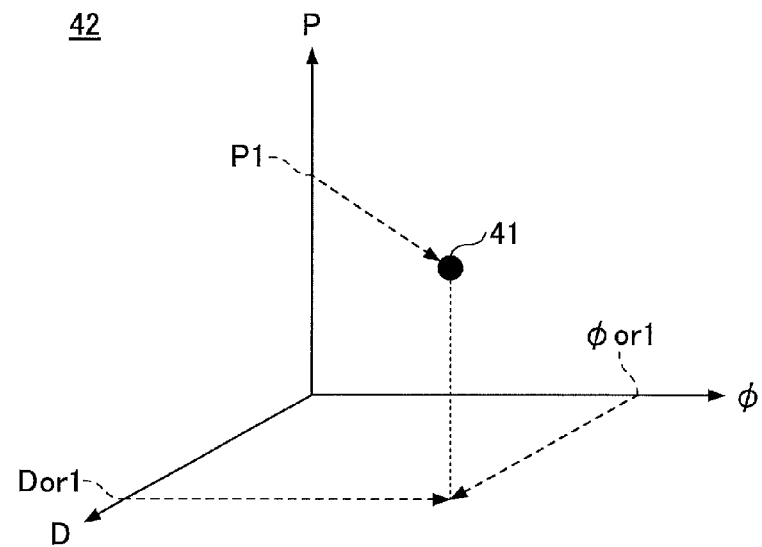
FIG. 8 is a diagram that schematically illustrates an example of a memory for recording map data.

Next, generation of a regression equation will be described as an example of the correspondence relation X. For example, as illustrated in FIG. 8, the generation unit 40 calculates measured data P1 of the transmission power P that is currently transmitted during a non-faulty period, associates the measured data P1 with the command phase difference φor1 when transmitting the measured data P1, and the command duty cycle Dor1 when transmitting the measured data P1, to obtain map data 41 having the three sets of data associated, and records the map data 41 in a memory 42. FIG. 8 is a diagram that schematically illustrates an example of the memory in which the map data 41 is recorded.

Figure 9:
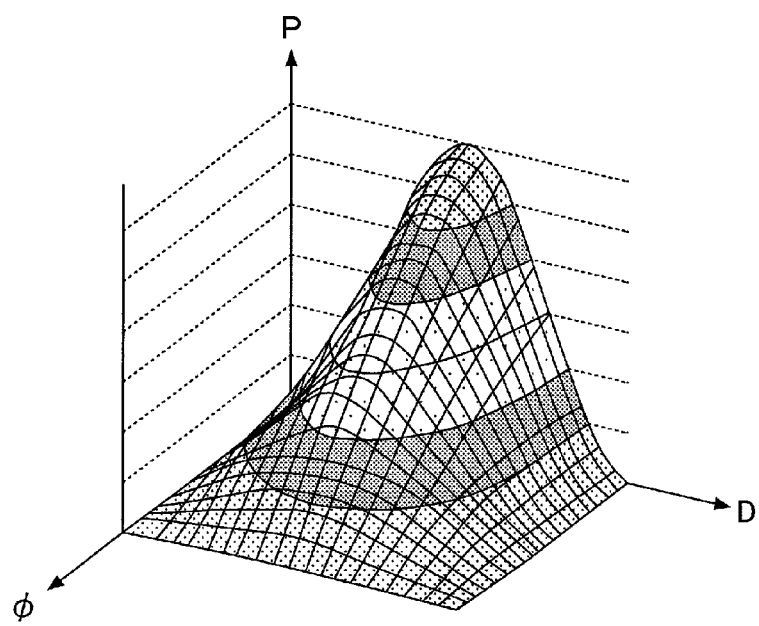
FIG. 9 is a diagram that schematically illustrates an example of a memory for recording multiple sets of map data.

Every time the measured data of the transmission power P changes during a non-faulty period, the generation unit 40 repeats the recording operations, to record in the memory 42 multiple sets of map data 41 about the transmission power P, the phase difference φ, and the duty cycle D, as illustrated in FIG. 9. By applying regression analysis such as a least-squares method to these sets of map data 41, the generation unit 40 can generate a regression equation by which the duty cycle D can be calculated from the transmission power P and the phase difference φ, or a regression equation by which the phase difference φ can be calculated from the transmission power P and the duty cycle D.

Figure 10:
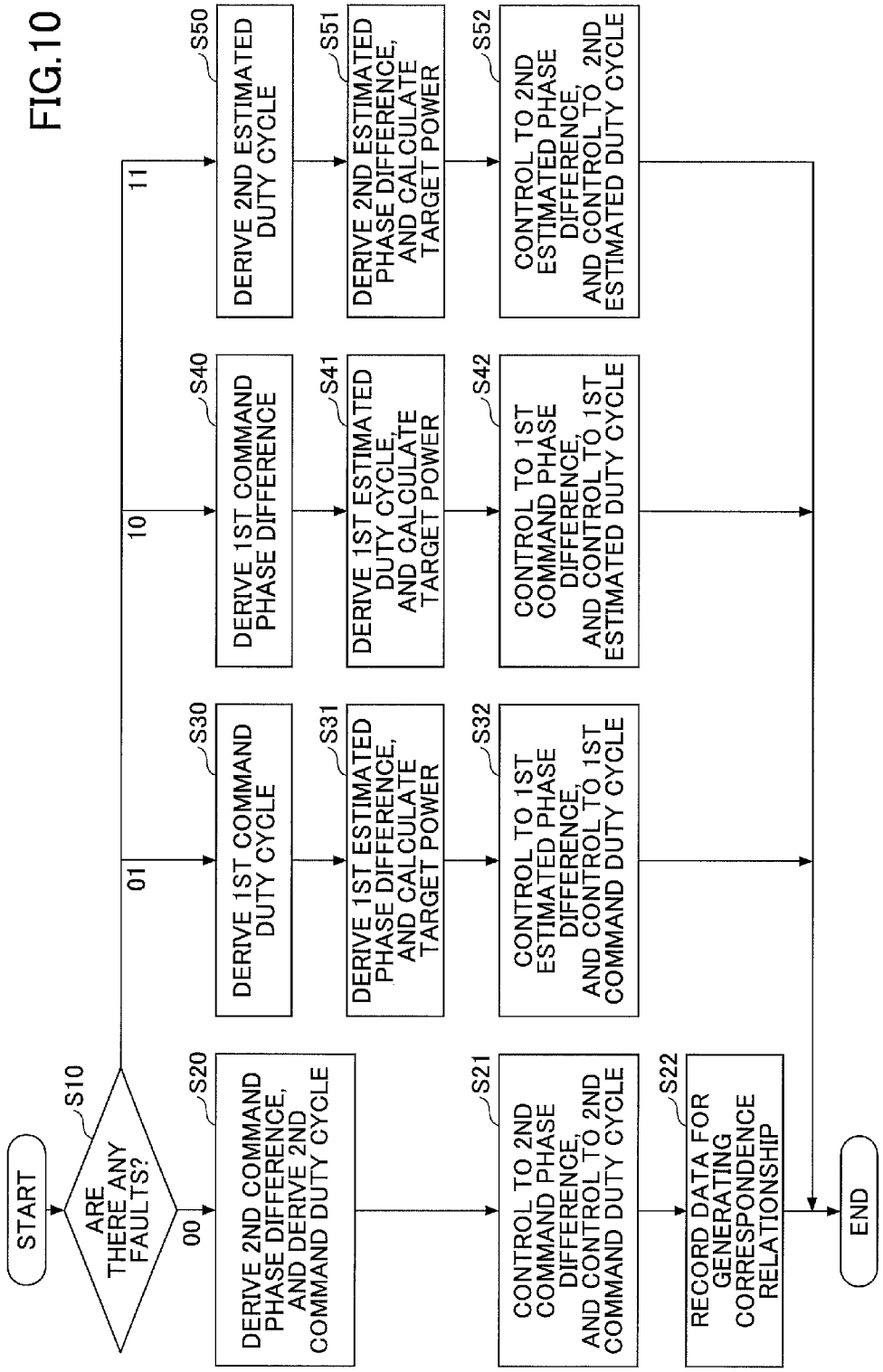
FIG. 10 is a flowchart that illustrates an example of a method of controlling a power conversion apparatus.

FIG. 10 is a flowchart that illustrates an example of a method of controlling the power supply apparatus 101. A process of this flow is executed repeatedly by a predetermined cycle. Steps in FIG. 10 will be described with reference to FIG. 3 and the like.

At Step S10, the fault determination unit 49 determines whether any faults have occurred in the first voltage detection unit 71 detecting the port voltage Va, and whether any faults have occurred in the second voltage detection unit 72 detecting the port voltage Vc (see above for an example of the fault detection method).

The fault determination unit 49 outputs a fault determination value "01" if a fault in the first voltage detection unit 71 is detected by the first fault detection unit 51, and a fault in the second voltage detection unit 72 is not detected by the second fault detection unit 52 at Step 10. If the fault determination value is "01", the control unit 50 executes Steps S30, S31, and S32.

At Step S30, by receiving feedback of a detection result of the port voltage Vc by the second voltage detection unit 72, the duty cycle command unit 54 derives the command duty cycle Dor to adjust the port voltage Vc to the target voltage Vco set for the second port 60c.

At Step S31, the phase difference estimation unit 55 derives, from the correspondence relation X, the target power Pr set as the target value of the transmission power P, and a first estimated phase difference that corresponds to a first command duty cycle, and outputs the first estimated phase difference as the estimated phase difference φoe. The target power Pr is calculated, for example, by the power calculation unit 48 at Step S31, by adding the product of the target voltage Vao multiplied by a detected value of the port current Ia, and the product of the target voltage Vco multiplied by a detected value of the port current Ic. At Step S31, the first current detection unit 73 detects the port current Ia, and the second current detection unit 74 detects the port current Ic.

At Step S32, since the fault determination value is "01", the switching control unit 59 controls the phase difference φ to the first estimated phase difference set to the estimated phase difference φoe, and controls the duty cycle D to the first command duty cycle set to the command duty cycle Dor. Thus, if a fault occurs in the first voltage detection unit 71, the phase difference φ is controlled to the estimated phase difference φoe, the duty cycle D is controlled to the command duty cycle Dor, and hence, it is possible to continue to control switching the primary full-bridge circuit 200 and the secondary full-bridge circuit 300.

The fault determination unit 49 outputs a fault determination value "10" if a fault in the first voltage detection unit 71 is not detected by the first fault detection unit 51, and a fault in the second voltage detection unit 72 is detected by the second fault detection unit 52 at Step 10. If the fault determination value is "10", the control unit 50 executes Steps S40, S41, and S42.

At Step S40, by receiving feedback of a detection result of the port voltage Va by the first voltage detection unit 71, the phase difference command unit 53 derives a first command phase difference to adjust the port voltage Va to the target voltage Vao, and outputs the first command phase difference as the command phase difference φor.

At Step S41, the duty cycle estimation unit 56 derives, from the correspondence relation X, the target power Pr set as the target value of the transmission power P, and the first estimated duty cycle that corresponds to the first command phase difference, and outputs the first estimated duty cycle as the estimated duty cycle Doe. The target power Pr is calculated, for example, by the power calculation unit 48 at Step S41, by adding the product of the target voltage Vao multiplied by a detected value of the port current Ia, and the product of the target voltage Vco multiplied by a detected value of the port current Ic. At Step S41, the first current detection unit 73 detects the port current Ia, and the second current detection unit 74 detects the port current Ic.

At Step S42, since the fault determination value is "10", the switching control unit 59 controls the phase difference φ to the first command phase difference set to the command phase difference φor, and controls the duty cycle D to the first estimated duty cycle set to the estimated duty cycle Doe. Thus, if a fault occurs in the second voltage detection unit 72, the phase difference φ is controlled to the command phase difference φor, the duty cycle D is controlled to the estimated duty cycle Doe, and hence, it is possible to continue to control switching the primary full-bridge circuit 200 and the secondary full-bridge circuit 300.

The fault determination unit 49 outputs a fault determination value "11" if a fault in the first voltage detection unit 71 is detected by the first fault detection unit 51, and a fault in the second voltage detection unit 72 is detected by the second fault detection unit 52 at Step 10. If the fault determination value is "11", the control unit 50 executes Steps S50, S51, and S52.

At Step S50, the duty cycle estimation unit 56 calculates a second estimated duty cycle by dividing the target voltage Vco by the target voltage Vao, and outputs the second estimated duty cycle as the estimated duty cycle Doe.

At Step S51, the phase difference estimation unit 55 derives, from the correspondence relation X, a second estimated phase difference that corresponds to the target power Pr set as the target value of the transmission power P and the second command duty cycle, and outputs the second estimated phase difference as the estimated phase difference φoe. The target power Pr is calculated, for example, by the power calculation unit 48 at Step S51, by adding the product of the target voltage Vao multiplied by a detected value of the port current Ia, and the product of the target voltage Vco multiplied by a detected value of the port current Ic.

At Step S51, the first current detection unit 73 detects the port current Ia, and the second current detection unit 74 detects the port current Ic.

At Step S52, since the fault determination value is "11", the switching control unit 59 controls the phase difference φ to the second estimated phase difference set to the estimated phase difference φoe, and controls the duty cycle D to the second estimated duty cycle set to the estimated duty cycle Doe. Thus, even if faults occur in both the first voltage detection unit 71 and the second voltage detection unit 72, it is possible to continue to control switching the primary full-bridge circuit 200 and the secondary full-bridge circuit 300.

The fault determination unit 49 outputs a fault determination value "00" if a fault in the first voltage detection unit 71 is not detected by the first fault detection unit 51, and a fault in the second voltage detection unit 72 is not detected by the second fault detection unit 52 at Step 10. If the fault determination value is "00", the control unit 50 executes Steps S20, S21, and S22.

At Step S20, by receiving feedback of a detection result of the port voltage Va by the first voltage detection unit 71, the phase difference command unit 53 derives a second command phase difference to adjust the port voltage Va to the target voltage Vao, and outputs the second command phase difference as the command phase difference φor. On the other hand, by receiving feedback of a detection result of the port voltage Vc by the second voltage detection unit 72, the duty cycle command unit 54 derives a second command duty cycle to adjust the port voltage Vc to the target voltage Vco, and outputs the second command duty cycle as the command the duty cycle Dor.

At Step S21, since the fault determination value is "00", the switching control unit 59 controls the phase difference φ to the second command phase difference set to the command phase difference φor, and controls the duty cycle D to the second command duty cycle set to the command duty cycle Dor.

At Step S22, the generation unit 40 records the second command phase difference, the second command duty cycle, and measured data of the transmission power P when controlling the phase difference φ to the second command phase difference, and controlling the duty cycle D to the second command duty cycle, in the memory 42. Thus, the map data 41 required for generating the correspondence relation X used during a faulty period of the voltage detection unit can be efficiently obtained during a non-faulty period of the voltage detection unit.

Note that, for example, if a fault in a voltage detection unit is detected, the generation unit 40 generates the correspondence relation X required for the voltage detection unit in which the fault is detected, by using the map data 41. Thus, it is possible to generate the correspondence relation X required for a voltage detection unit in which a fault is detected, at a required timing. For example, if the fault determination value is "01", the generation unit 40 generates a correspondence relation X with which the first estimated phase difference can be derived from the target power Pr and the first command duty cycle. Also, if the fault determination value is "10", the generation unit 40 generates a correspondence relation X with which the first estimated duty cycle can be derived from the target power Pr and the first command phase difference. Also, if the fault determination value is "11", the generation unit 40 generates a correspondence relation X with which the second estimated phase difference can be derived from the target power Pr and the second estimated duty cycle.

Alternatively, the generation unit 40 may generate a correspondence relation X when more than a predetermined number of sets of map data 41 have been recorded in the memory 42.

The method of controlling a power conversion apparatus and the power conversion apparatus have been described with the embodiments as above. Note that the present invention is not limited to the above embodiments. Various modifications and improvements can be made within the scope of the present invention by combining and/or replacing a part of or all of the embodiments with the others.

For example, the arms are not limited to semiconductor switching elements of MOSFETs (Metal-Oxide-Semiconductor Field Effect transistors) or insulated-gate bipolar transistors (IGBTs), but may be other semiconductor switching elements that execute on and off operations. For example, the arms may be unipolar transistors or bipolar transistors.

Also, the control unit 50 may control the duty cycle D of the secondary full-bridge circuit 300, by shifting the duty cycle D to a value different from the duty cycle D of the primary full-bridge circuit 200 within a range where the phase difference φ can be controlled. Also, the control unit 50 may control the first phase difference φu and the second phase difference φv illustrated in FIG. 2 to different values shifted from each other within a range where the duty cycle D can be controlled.

Also, in the above description, the primary side may be defined as the secondary side, the secondary side may be defined as the primary side.

The present application is based on and claims the benefit of priority of Japanese Priority Application No. 2015-097416, filed on May 12, 2015, the entire contents of which are hereby incorporated by reference.

The invention claimed is:

1. A method of controlling a power conversion apparatus that includes
   a transformer configured to include a primary coil and a secondary coil,
   a primary full-bridge circuit configured to have the primary coil disposed at a bridge part,
   a secondary full-bridge circuit configured to have the secondary coil disposed at a bridge part,
   a first port configured to be connected with a positive bus-bar of the primary full-bridge circuit,
   a second port configured to be connected with a tap of the primary coil,
   a first voltage detection unit configured to detect a voltage of the first port, and
   a second voltage detection unit configured to detect a voltage of the second port,
   the method comprising:
   detecting a fault in the first voltage detection unit and the second voltage detection unit; and
   executing, when the fault of the second voltage detection unit is not detected, and the fault of the first voltage detection unit is detected by the detecting,
      deriving a first command duty cycle to adjust the voltage of the second port to a target voltage of the second port, by receiving feedback of a detection result of the voltage of the second port by the second voltage detection unit,
      deriving a first estimated phase difference corresponding to target power, which is a target value of transmission power transmitted from the secondary full-bridge circuit to the primary full-bridge circuit, and the first command duty cycle, from a correspondence relation among a phase difference between switching of the primary full-bridge circuit and switching of the secondary full-bridge circuit, a duty cycle of the switching of the primary full-bridge circuit, and the transmission power, and
      controlling the phase difference to the first estimated phase difference, and controlling the duty cycle to the first command duty cycle.

2. A method of controlling a power conversion apparatus that includes
   a transformer configured to include a primary coil and a secondary coil,
   a primary full-bridge circuit configured to have the primary coil disposed at a bridge part,
   a secondary full-bridge circuit configured to have the secondary coil disposed at a bridge part,
   a first port configured to be connected with a positive bus-bar of the primary full-bridge circuit,
   a second port configured to be connected with a tap of the primary coil,
   a first voltage detection unit configured to detect a voltage of the first port, and
   a second voltage detection unit configured to detect a voltage of the second port,
   the method comprising:
   detecting a fault in the first voltage detection unit and the second voltage detection unit; and
   executing, when the fault of the first voltage detection unit is not detected, and the fault of the second voltage detection unit is detected by the detecting,
      deriving a first command phase difference to adjust the voltage of the first port to a target voltage of the first port by receiving feedback of a detection result of the voltage of the first port by the first voltage detection unit,
      deriving a first estimated duty cycle corresponding to target power, which is a target value of transmission power transmitted from the secondary full-bridge circuit to the primary full-bridge circuit, and the first command phase difference, from a correspondence relation among a phase difference between switching of the primary full-bridge circuit and switching of the secondary full-bridge circuit, a duty cycle of the switching of the primary full-bridge circuit, and the transmission power, and controlling the phase difference to the first command phase difference, and controlling the duty cycle to the first estimated duty cycle.

3. The method of controlling the power conversion apparatus as claimed in claim 1, the method further comprising:

executing, when the fault of the first voltage detection unit and the fault of the second voltage detection unit are detected by the detecting, calculating a second estimated duty cycle by dividing the target voltage of the second port by the target voltage of the first port, deriving a second estimated phase difference corresponding to the target power being the target value of the transmission power and the second estimated duty cycle, from the correspondence relation, and controlling the phase difference to the second estimated phase difference, and controlling the duty cycle to the second estimated duty cycle.

4. The method of controlling the power conversion apparatus as claimed in claim 1, the method further comprising:

detecting a current flowing in the first port, and a current flowing in the second port; and calculating the target power by adding a product of the target voltage of the first port multiplied by a detected value of the current flowing in the first port, and a product of the target voltage of the second port multiplied by a detected value of the current flowing in the second port.

5. The method of controlling the power conversion apparatus as claimed in claim 1, the method further comprising:

executing, when the fault of the first voltage detection unit, and the fault of the second voltage detection unit are not detected by the detecting, deriving a second command phase difference to adjust the voltage of the first port to the target voltage of the first port by receiving feedback of a detection result of the voltage of the first port by the first voltage detection unit, and deriving a second command duty cycle to adjust the voltage of the second port to the target voltage of the second port, by receiving feedback of a detection result of the voltage of the second port by the second voltage detection unit, controlling the phase difference to the second command phase difference, and controlling the duty cycle to the second command duty cycle, and recording the second command phase difference, the second command duty cycle, and measured data of the transmission power obtained when controlling the phase difference to the second command phase difference, and controlling the duty cycle to the second command duty cycle, to be used for generating the correspondence relation.

6. The method of controlling the power conversion apparatus as claimed in claim 1, wherein the detecting detects the first voltage detection unit being faulty when a detected value of the first port voltage detected by the first voltage detection unit, deviates from a predetermined first voltage range for a predetermined first elapsed time or longer, after an operation period predetermined as a period during which the voltage of the first port rises from zero to the target voltage of the first port, has passed, wherein the detecting detects the second voltage detection unit being faulty when a detected value of the second port voltage detected by the second voltage detection unit, deviates from a predetermined second voltage range for a predetermined second elapsed time or longer, after an operation period predetermined as a period during which the voltage of the second port rises from zero to the target voltage of the second port, has passed, wherein an upper limit value of the first voltage range is higher than the target voltage of the first port, and a lower limit value of the first voltage range is lower than the target voltage of the first port, wherein an upper limit value of the second voltage range is higher than the target voltage of the second port, and a lower limit value of the second voltage range is lower than the target voltage of the second port.

7. A power conversion apparatus, comprising:

a transformer configured to include a primary coil and a secondary coil;

a primary full-bridge circuit configured to have the primary coil disposed at a bridge part;

a secondary full-bridge circuit configured to have the secondary coil disposed at a bridge part;

a first port configured to be connected with a positive bus-bar of the primary full-bridge circuit;

a second port configured to be connected with a tap of the primary coil;

a first voltage detection unit configured to detect a voltage of the first port;

a second voltage detection unit configured to detect a voltage of the second port;

a first fault detection unit configured to detect a fault in the first voltage detection unit;

a second fault detection unit configured to detect a fault in the second voltage detection unit;

a phase difference command unit configured to derive a command phase difference to adjust the voltage of the first port to a target voltage of the first port, by receiving feedback of a detection result of the voltage of the first port by the first voltage detection unit;

a duty cycle command unit configured to derive a command duty cycle to adjust the voltage of the second port to a target voltage of the second port, by receiving feedback of a detection result of the voltage of the second port by the second voltage detection unit;

a phase difference estimation unit configured to estimate a phase difference corresponding to target power, which is a target value of transmission power transmitted from the secondary full-bridge circuit to the primary full-bridge circuit, and the command duty cycle, from a correspondence relation among a phase difference between switching of the primary full-bridge circuit and switching of the secondary full-bridge circuit, a duty cycle of the switching of the primary full-bridge circuit, and the transmission power, and to output the estimated phase difference;

a duty cycle estimation unit configured to estimate a duty cycle corresponding to the target power being the target value of the transmission power and the command phase difference, from the correspondence relation, and to output the estimated duty cycle;

a first selection unit configured to select the command phase difference when the fault of the first voltage detection unit is not detected by the first fault detection unit, and to select the estimated phase difference when the fault in the first voltage detection unit is detected by the first fault detection unit;

a second selection unit configured to select the command duty cycle when the fault of the second voltage detection unit is not detected by the second fault detection unit, and to select the estimated duty cycle when the fault in the second voltage detection unit is detected by the second fault detection unit; and a switching control unit configured to control the phase difference to the phase difference selected by the first selection unit, and to control the duty cycle to the duty cycle selected by the second selection unit.

8. The power conversion apparatus as claimed in claim 7, wherein the duty cycle estimation unit outputs a calculated duty cycle obtained by dividing the target voltage of the second port by the target voltage of the first port, as the estimated duty cycle, when the fault in the first voltage detection unit is detected by the first fault detection unit, and the fault in the second voltage detection unit is detected by the second fault detection unit, wherein the phase difference estimation unit estimates the phase difference corresponding to the target power being the target value of the transmission power and the calculated duty cycle, from the correspondence relation, and outputs the estimated phase difference.

9. The power conversion apparatus as claimed in claim 7, further comprising:

a first current detection unit configured to detect a current flowing in the first port;

a second current detection unit configured to detect a current flowing in the second port; and a power calculation unit configured to calculate the target power by adding a product of the target voltage of the first port multiplied by a detected value of the current flowing in the first port, and a product of the target voltage of the second port multiplied by a detected value of the current flowing in the second port.

10. The power conversion apparatus as claimed in claim 7, further comprising:

a generation unit configured to obtain the command phase difference and the command duty cycle during a non-faulty period during which the fault of the first voltage detection unit is not detected by the first fault detection unit, and the fault in the second voltage detection unit is not detected by the second fault detection unit, and to generate the correspondence relation by using the command phase difference during the non-faulty period, the command duty cycle during the non-faulty period, measured data of the transmission power obtained when controlling the phase difference to the command phase difference during the non-faulty period, and controlling the duty cycle to the command duty cycle during the non-faulty period.

* * * * *